United States Patent Office 3,436,577
Patented Apr. 1, 1969

3,436,577
BRUSH HOLDER CONSTRUCTION
Frank T. De Wolf, Erie, Pa., assignor to General Electric Company, a corporation of New York
Filed Jan. 10, 1966, Ser. No. 519,691
Int. Cl. H02k *13/10;* H01r *39/40*
U.S. Cl. 310—246      5 Claims

ABSTRACT OF THE DISCLOSURE

A box-type brush support for dynamoelectric machines, in which a brush is pressed against a commutator, overcomes the effects of heating a reaction surface against which the brush bears by providing a wall opposite the reaction surface which is discontinuous, as by being slotted, for its entire length.

---

Figure 1:
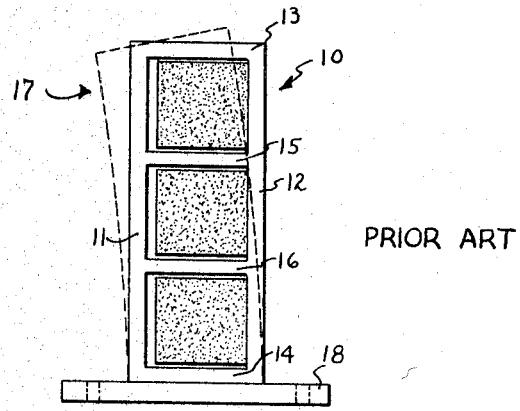

The present invention relates to dynamoelectric machines and more particularly to a new and improved brush holder for such machines.

In certain types of dynamoelectric machines, brush holders having box-type brush support members are frequently used to guide the carbon blocks or brushes for movement toward the surface of a commutator. Conventionally, a box-type brush support member includes walls defining a longitudinal opening within which brushes are positioned. Such brush support members are often provided with multiple or "ganged" openings with the brush support member being connected at only one end, usually to the motor end shield. The assembly is usually designed so that during machine operation the combination of forces acting on the brushes hold them in a stable position against one of the walls, which wall provides a reaction surface against which the brush bears when pressed into contact with the commutator. As a result, most of the heat developed in the brushes due to the passage of current therethrough, or due to the frictional contact between the brush faces and the commutator, is transmitted to this side, or reaction surface, wall, thus causing it to become more heated than the opposite wall. Since the brush support member is anchored at one of the end walls and can distend only away from that end wall, the unequal heating results in the differential distention of the side walls. The brush support member thus warps transversely to the length of the side walls and forces the brushes away from their optimum operating position as well as into a position wherein only the trailing edge or heel of the brush face rides on the commutator surface. This is particularly so during a change in the temperature of the brush support member at start-up or as caused by changes in load current, for example.

An object of the present invention, therefore, is to provide an improved box-type brush support member which will not distort transversely to the length of its side walls when those walls are unequally heated.

It is another object of the present invention to provide an improved brush support member in which the heating of the walls thereof results in the brushes being shifted axially along the commutator in a manner which results in the wear on the commutator being more evenly distributed.

To fulfill these and other objects, the present invention provides a brush support member having at least one longitudinal channel opening adapted to have a brush arranged therein for longitudinal movement toward a commutator surface. The longitudinal channel opening is defined by three structurally continuous walls. Two of the walls are spaced apart and connected to the third wall which wall provides the reaction surface against which the brush bears when pressed into operative contact with the commutator surface. A fourth wall may be provided opposite the wall providing the reaction surface but such wall must have a structural discontinuity, such as a slot, extending along the entire length of such wall.

Figure 2:
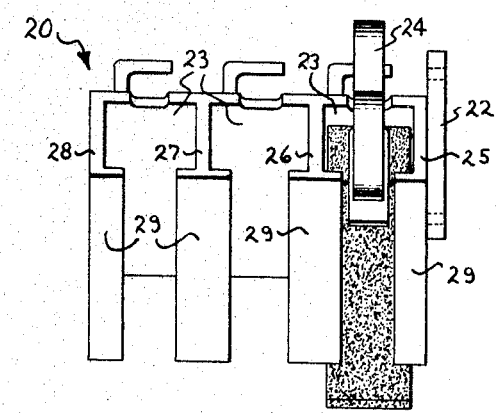

While the specification concludes with claims particularly pointing out and distinctly claiming that which is regarded as the present invention, the invention itself may be better understood by referring to the following detailed description in conjunction with the accompanying drawing in which:

FIGURE 1 represents a diagrammatic top view of a prior art brush support member in both its non-distorted and its distorted forms; and FIGURE 2 is a perspective view of a brush holder constructed in accordance with the teachings of the present invention.

Referring now to FIGURE 1 of the drawing, there is shown a top view of a conventional box-type brush support member 10 having opposed side walls 11 and 12, opposed end walls 13 and 14 and intermediate walls 15 and 16 joined to form a rectangular structure having three longitudinal openings therethrough. Carbon bars or brushes, as shown, are guided by the respective openings of the brush support member into contact with a commutator located directly below the brushes but not illustrated in FIGURE 1. As a result of the combination of forces acting on the brush and the angular relationship of these forces, the brushes are held against the side wall 12 which provides a reaction surface therefor. As a result of the intimate contact between the brush and this reaction surface wall, the reaction surface wall 12 is heated to a greater extent than is the opposite side wall 11. This is particularly so during a change in machine loading.

Since the side walls 11 and 12 are connected at one end to an immovable support 18 which is in turn connected to the motor end shield (not shown), the walls 11 and 12 can distend in one direction only. The reaction surface side wall 12 distends more than sidewall 11 and this unequal thermal distention causes the entire support member to warp transversely to the length of the side walls producing an effect similar to that known commonly as the "bi-metallic effect." The shape of the distorted holder is shown in greatly exaggerated fashion at 17. When the brush holder is distorted as shown at 17, the leading edges of the brushes are lifted clear of the commutator so that only the trailing edge remains in contact therewith. The limited contact existing between the trailing edge of the brush and the commutator has detrimental effects on the operational characteristics of the machine. For example, this limited contact has the effect of shifting the brush location significantly causing sparking at the brushes and also causes the brushes to wear unequally, thus shortening their useful life.

To eliminate this transverse distortion and all its attendant disadvantages, the present invention contemplates the provision of a brush support member 20 such as shown in FIGURE 2. As shown, brush support member 20 includes walls which define a number of longitudinal openings which are adapted to have brushes arranged therein for longitudinal movement toward a commutator surface (not shown). One end of brush support member 20 terminates in a support bracket 22 for connection to the end shield (not shown) of the machine. Each of the longitudinal openings in the brush support member 20 is defined by three walls each of which is structurally continuous. One wall 23 provides a reaction surface against which the brushes bear when pressed into operative contact with the commutator surface 21 by a suitable spring means 24. The other two walls which define the opening are spaced apart and have one edge connected to the reaction surface wall 23. If desired, a fourth wall may be provided opposite the reaction surface wall 23 as long as such wall is structurally discontinuous, such as by having a slot extending longitudinally throughout such wall.

An arrangement of such type has been selected for illustration in FIGURE 2. Thus, as shown, each of the longitudinal openings of the brush support member 20 comprises three structurally continuous walls and one wall which is structurally discontinuous. That is, brush support member 20 includes a structurally continuous reaction surface wall 23, and a number of structurally continuous transverse walls 25, 26, 27 and 28 each of which is connected along one edge to the wall 23. The other edge of each of the transverse walls 25–28 is provided with a flange portion 29 which extends parallel with the reaction surface wall 23. In the arrangement shown, where a number of brush openings have been provided, the flange 29 of transverse wall 25 is directed away from the support bracket 22 while the flange 29 of transverse wall 28 is directed toward such support bracket. The flanges 29 on the intermediate transverse walls 26 and 27 extend in both directions. Thus, since the flanges 29 extend toward each other they provide, in effect, a fourth structurally discontinuous wall opposite reaction surface wall 23. That is, there is a space, or slot, throughout the entire length of such wall which in FIGURE 2 extends from top to bottom of the brush support member 20.

As is well known to those skilled in the art, brush support member 20 can readily be designed so that the forces acting on the brushes when they are pressed into operative contact with the commutator surface are operative to hold the brushes against the brush recation surface wall 23. As is also known this can be provided for machines intended to operate in one or both directions of rotation.

Because of the better heat transfer occasioned by the intimate contact between the brushes and this reaction surface wall 23, the heat developed in the brushes and at the brush-commutator interface passes to the wall 23 causing it to distend or stretch. As the reaction surface wall 23 distends the transverse walls 26, 27 and 28 are carried with it and, since these transverse walls are connected only at one of their edges, they do not cause any transverse distortion of the brush support member. Thus, the brushes retain full contact with the commutator surface and are thereby capable of achieving their full current carrying capacity. Moreover, the location of the current center in the brushes in a circumferential direction does not change with changes in temperature of the brush support member so no brush shifting occurs. The harmful effects of such brush shifting encountered with the prior art arrangements are thus avoided with the brush support member of the present invention.

The only substantial displacement of brush support member 20 with changes in temperature is exhibited as an axial elongation thereof. Since this elongation merely displaces the brushes axially along the commutator surface it has the beneficial effect of distributing wear thereon.

Although there has been described at present what is considered to be a preferred embodiment of the invention, many modifications and alterations may occur to those skilled in the art. Therefore, it is intended that the appended claims cover all such modifications and alterations as fall within the true spirit and scope of the invention.

What I claim as new and desire to secure by Letters Patent of the United States is:

1. In combination with a brush holder assembly for a dynamoelectric machine having a commutator, a metal brush support member having at least one longitudinal opening adapted to have a brush arranged therein for longitudinal movement toward the commutator surface, said opening being defined by first, second and third structurally continuous walls wherein said first wall is arranged to provide the reaction surface against which said brush bears when pressed into operative contact with said commutator surface and said second and third walls are spaced apart and are interconected solely through said first wall which is connected to an edge of each of said second and third walls.

2. The brush support member of claim 1 wherein said second and third walls are each provided with a flange portion at the edge thereof opposite that connected to said first wall, said flanges being directed toward each other and parallel with said first wall to provide a fourth wall opposite said first wall which is discontinuous along its entire longitudinal dimension.

3. In combination with a brush holder assembly for a dynamoelectric machine having a commutator, a metal brush support member having a plurality of longitudinal openings therein arranged axially of said commutator and in side by side relationship, each of said openings being defined by first, second and third structurally continuous, mutually perpendicular walls wherein said first wall is arranged to provide the reaction surface against which said brush bears when pressed into operative contact with said commutator surface and said second and third walls are spaced-apart and are interconnected solely through said first wall which is connected to an edge of each of said second and third walls.

4. The brush support member of claim 1 wherein said second and third walls are each provided with a flange portion at the edge thereof opposite that connected to said first wall, said flanges being directed toward each other and parallel with said first wall to provide a fourth wall opposite said first wall which is discontinuous along its entire longitudinal dimension.

5. In a brush holder for a dynamoelectric machine, a generally rectangular brush support member comprising wall portions defining an opening adapted to have a brush arranged therein for longitudinal movement toward a commutator surface, said wall portions having a pair of oppositely disposed longitudinal ends, with at least one of said wall portions having a discontinuity extending along its entire longitudinal dimension so that unjoined edges of the last mentioned wall portion extend from one of said longitudinal ends to the other.

References Cited

UNITED STATES PATENTS

| | | | |
|---|---|---|---|
| 2,822,486 | 2/1958 | Newell | 310—246 |
| 2,862,124 | 11/1958 | Huber | 310—246 |
| 3,127,533 | 3/1964 | Gardner | 310—245 |

ORIS L. RADER, *Primary Examiner.*

G. NUNEZ, *Assistant Examiner.*

U.S. Cl. X.R.

310—242